US006288776B1

(12) United States Patent
Cahill et al.

(10) Patent No.: US 6,288,776 B1
(45) Date of Patent: Sep. 11, 2001

(54) METHOD FOR UNAMBIGUOUS RANGE ESTIMATION

(75) Inventors: Nathan D. Cahill; Lawrence A. Ray, both of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/449,101

(22) Filed: Nov. 24, 1999

(51) Int. Cl.[7] .............................. G01C 3/08; G01B 11/02
(52) U.S. Cl. ............................ 356/5.1; 356/496; 356/456
(58) Field of Search ..................... 356/456, 482, 356/5.01, 5.1, 495, 496

(56) References Cited

U.S. PATENT DOCUMENTS

| 4,935,616 | 6/1990 | Scott ................................... 250/213 |
| 5,581,345 | * 12/1996 | Oki et al. . |
| 5,621,807 | 4/1997 | Eibert et al. ......................... 382/103 |
| 5,995,223 | * 11/1999 | Power . |

OTHER PUBLICATIONS

"Least–Squares Two–Dimensional Phase Unwrapping Using FFT's" by Mark D. Pritt and Jerome S. Shipman, *IEEE Transactions on Geoscience and Remote Sensing*, vol. 32, No. 3, May 1994, pp. 706–708.

"Robust two–dimensional weighted and unweighted phase unwrapping that uses fast transforms and iterative methods" by Dennis C. Ghiglia and Louis A. Romero. *J. Opt. Soc. Am. A*/vol. 11, No. 1, Jan. 1994, pp. 107–117.

"Satellite radar interferometry: Two–dimensional phase unwrapping" by Richard M. Goldstein, Howard A. Zebker, and Charles L. Werner. *Radio Science*, vol. 23, No. 4, pp. 713–720. Aug. 1988.

"SAR Interferometry: A 2–D Phase Unwrapping Technique Based on Phase and Absolute Values Informations" by C. Prati, M. Giani and N. Leuratti. *Proc. Int. Geoscience & Remote Sensing Symposium IGARSS 1990*, Washington. D.C. pp. 2043–2046, 1990.

* cited by examiner

Primary Examiner—Stephen C. Buczinski
(74) Attorney, Agent, or Firm—David M. Woods (57) ABSTRACT

A method of unambiguous range estimation is provided for use with a range imaging system that derives phase images from image pixels of a digital image. The method involves generating (a) a first phase image having one or more ambiguous phase intervals and (b) at least one additional phase image that is generated by shifting the phase intervals of the first phase image. Then at least one region of intersection between phase intervals in the two phase images is identified. Finally, the phase of at least one of the ambiguous phase intervals in the first phase image is adjusted based on values of the phase of the image pixels that belong to the region of intersection. As a result, the phase adjustment unwraps the phase ambiguity in the phase intervals of the first phase image.

19 Claims, 4 Drawing Sheets

METHOD FOR UNAMBIGUOUS RANGE ESTIMATION

FIELD OF THE INVENTION

The invention relates generally to the field of processing range images captured by a range imaging system, and in particular to the estimation and unwrapping of phase images captured by a scanner-less laser radar range imaging system.

BACKGROUND OF THE INVENTION

A scanner-less laser radar range imaging system is described in U.S. Pat. No. 4,935,616. The system described therein illuminates a scene object with an amplitude modulated laser source, wherein the amplitude modulation is in the range of 10MHz. The image capture portion of the system includes a micro-channel plate that is capable of modulating the optical signal reflected from the scene object. The phase shift of the intensity modulation reflected from the scene object can be calculated by capturing two images, one without modulating the optical signal, and another with the optical signal modulated by the micro-channel plate in phase with the same amplitude modulated frequency as used to modulate the laser source. Both images are registered spatially, and the difference between them is caused by the interference of the two modulating wave patterns, which produces a dc signal proportional to the phase shift. Once the phase shift has been established, range to the object can be computed.

Since the phase shift can only be determined modulo $2\pi$ the resulting range can only be found to within one wavelength of the modulation of the laser. To calculate the range at each point in the image, the correct integer number of phase cycles must be added to each phase measurement; that is, the phase must be "unwrapped". It is therefore desirable to resolve the ambiguous (or wrapped) phase measurements to determine unambiguous (or unwrapped) phase.

The unambiguous phase, in turn, can be used to calculate unambiguous range. The aforementioned '616 patent suggests modulating the laser and receiver with different frequencies in order to produce two range images with different modulating frequencies. This would yield range unambiguous to within one wavelength of the wave whose frequency is the greatest common factor of the frequencies of the laser and receiver, which is a lower frequency than either of the two modulating frequencies. Even though this may reduce ambiguity problems in many situations, they still exist albeit on a smaller scale.

There are two main types of methods for solving the phase ambiguity problem: branch-cut methods and weighted least-squares methods.

Branch-cut methods (such as those described in Goldstein, Zebker, and Werner, "Satellite radar interferometry: two-dimensional phase unwrapping", *Radio Science*, Vol. 23, pp. 713–720, 1998; and Prati, Giani, and Leurati, "SAR interferometry: A 2-D phase unwrapping technique based on phase and absolute values informations", *Proc. Int. Geoscience & Remote Sensing Symposium IGARSS 1990*, Washington, D.C., pp. 2043–2046, 1990) use lines to connect phase inconsistencies (or residues). Branch-cut methods fail to perform adequately when the number of residues is high. They often resort to local averaging, which is undesirable because it can dampen high frequency information. Least-squares methods (such as those described in Ghiglia and Romero, "Robust two-dimensional weighted and unweighted phase unwrapping that uses fast transforms and iterative methods", *Journal of the Optical Society of America*, Vol. 11, pp.107–117, 1994; and Pritt and Shipman, "Least-squares two dimensional phase unwrapping using FFT's", *IEEE Transactions on Geoscience and Remote Sensing*, Vol. 32, pp. 706–708, 1994) determine a phase finction that minimizes the error in the gradient estimates. If there are areas in the ambiguous phase image with a high noise content, nearby areas with a low noise content can be distorted by a least-squares phase unwrapping algorithm.

SUMMARY OF THE INVENTION

An object of the invention is to provide a method of unambiguous range estimation without the drawbacks in the known branch-cut and weighted least squares methods.

It is a further object of this invention to unambiguate (or unwrap) the measured phase shifts using a morphological technique.

It is a further object of this invention to provide a method of unwrapping phase shifts obtained by a scanner-less laser radar range imaging system that produces an image bundle (at least three images corresponding to distinct phase offsets of the capture device and/or illumination source).

The present invention is directed to overcoming one or more of the problems set forth above. Briefly summarized, according to one aspect of the present invention, a method of unambiguous range estimation is provided for use with a range imaging system that derives phase images from image pixels of a digital image. The method involves generating (a) a first phase image having one or more ambiguous phase intervals and (b) at least one additional phase image that is generated by shifting the phase intervals of the first phase image. Then at least one region of intersection between phase intervals in the two phase images is identified. Next, the phase of at least one of the ambiguous phase intervals in the first phase image is adjusted based on values of the phase of the image pixels that belong to the region of intersection. As a result, the phase adjustment unwraps the phase ambiguity in the phase intervals of the first phase image.

Instead of using a path-following technique or a technique based on a least-squares solution, this invention will resolve phase ambiguities by the use of a "region-moving" algorithm. By utilizing a model where ambiguous phase is determined by capturing images from at least three different phase shifts of either the illumination source (e.g., a laser) or the capture device (e.g., an intensifier) to obtain a wrapped phase image, a parameter in the model is then perturbed that spatially shifts regions of ambiguity in the wrapped phase image.

Using morphological image processing techniques, the spatial movements of the regions of ambiguity are followed. Appropriate phase offsets are determined by this region-moving technique, generating an unambiguous phase image. The advantage of this region-moving technique in relation to other phase-unwrapping techniques is that it determines unambiguous phase without distortions (i.e. given only the output of the region-moving technique, the input can be found exactly).

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because range imaging devices employing illumination sources with laser illuminators, and capture devices employing image intensifiers and electronic sensors, are well known, the present description will be directed in particular to elements forming part of, or cooperating more directly with, apparatus in accordance with the present invention. Elements not specifically shown or described herein may be selected from those known in the art. Certain aspects of the embodiments to be described may be provided in software. Given the system as described in the following materials, all such software implementation needed for practice of the invention is conventional and within the ordinary skill in such arts.

In the following description, a preferred embodiment of the present invention will be described at least in part as a software program. Those skilled in the art will readily recognize that the equivalent of such software may also be constructed in hardware. Because phase unwrapping algorithms and methods are well known, the present description will be directed in particular to aspects of such algorithms and methods forming part of, or cooperating more directly with, the present invention. Other aspects of such algorithms and systems, and hardware and/or software for producing and otherwise processing the image signals involved therewith, not specifically shown or described herein may be selected from such systems, algorithms, components and elements known in the art.

Still further, as used herein, the computer program may be stored in a computer readable storage medium, which may comprise, for example;

magnetic storage media such as a magnetic disk (such as a floppy disk) or magnetic tape; optical storage media such as an optical disc, optical tape, or machine readable bar code; solid state electronic storage devices such as random access memory (RAM), or read only memory (OM); or any other physical device or medium employed to store a computer program.

Figure 1:
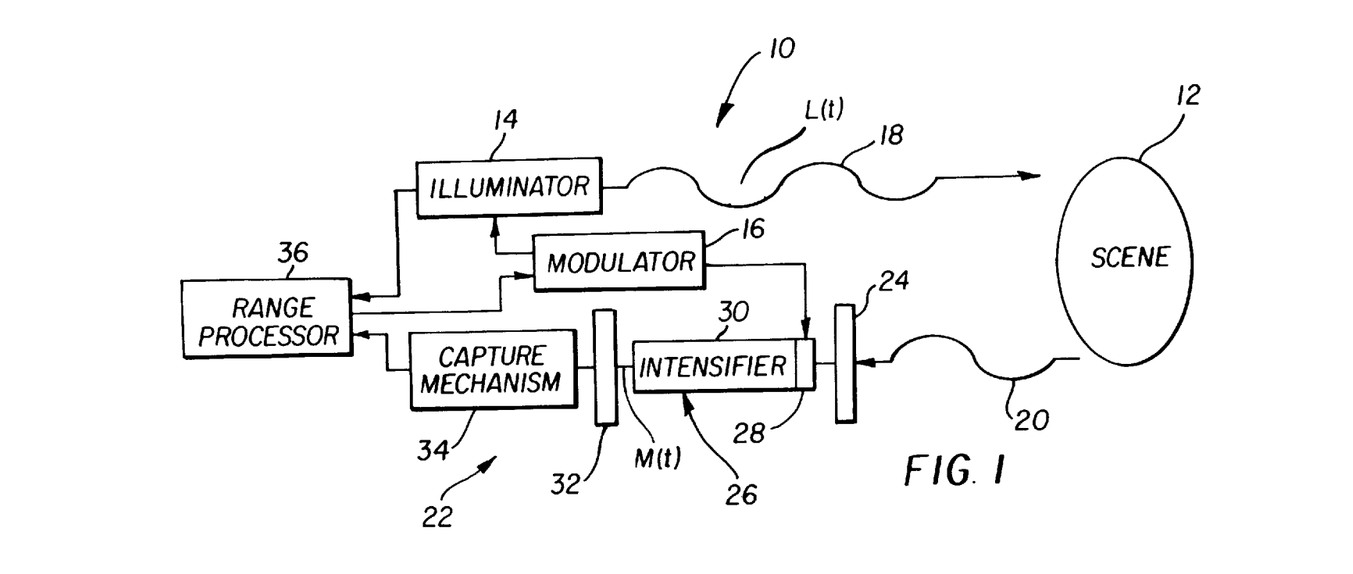
FIG. 1 is a block diagram of a known range imaging system which can be used in the practice of the invention to capture a bundle of images.

Referring first to FIG. 1, an range imaging system 10 is shown as a laser radar that is used to illuminate a scene 12 and then to capture an image bundle comprising a minimum of three images of the scene 12. An illuminator 14 emits a beam of electromagnetic radiation whose frequency is controlled by a modulator 16. Typically the illuminator 14 is a laser device which includes an optical diffuser in order to effect a wide-field illumination. The modulator 16 provides an amplitude varying sinusoidal modulation. The modulated illumination source is modeled by:

$$L(t)=\mu_L+\eta \sin(2\pi\lambda t) \quad \text{(Eq. 1)}$$

where $\mu_L$ is the mean illumination, $\eta$ is the modulus of the illumination source, and $\lambda$ is the modulation frequency applied to the illuminator 14. The modulation frequency is sufficiently high (e.g., 10 mHz) to attain sufficiently accurate range estimates. The output beam 18 is directed toward the scene 12 and a reflected beam 20 is directed back toward a receiving section 22. As is well known, the reflected beam 20 is a delayed version of the transmitted output beam 18, with the amount of phase delay being equivalent to the distance of the scene 12 from the image capture system. The reflected beam 20 is sensed by a photocathode 24, which converts its amplitude variations into a modulated electron stream that strikes an image intensifier 26. The output of the image intensifier 26 is modeled by:

$$M(t)=\mu_M+\gamma \sin(2\pi\lambda t) \quad \text{(Eq. 2)}$$

where $\mu_M$ is the mean intensification, $\gamma$ is the modulus of the intensification and $\lambda$ is the modulation frequency applied to the intensifier 26. The purpose of the image intensifier is not so much to intensify the image, but rather to act as a modulating shutter. Upon entering the image intensifier 26, the electron stream first strikes a thin conductive sheet 28 connected to the modulator 16, where the electron stream is modulated by a modulating signal from the modulator 16. The modulated electron stream is then amplified through secondary emission by a microchannel plate 30. The intensified electron stream bombards a phosphor screen 32, which converts the energy into a visible light image. The intensified light image signal is captured by a capture mechanism 34, such as a charge-coupled device (CCD). The captured image signal is applied to a range processor 36 to determine the phase offset at each point in the scene. The phase term ω of an object at a range ρ meters is given by:

$$\omega = \frac{2\rho\lambda}{c} \bmod 2\pi \quad \text{(Eq. 3)}$$

where c is the velocity of light in a vacuum. The reflected light at this point is modeled by:

$$R(t)=\mu_L+\kappa \sin(2\pi\lambda t+\omega) \quad \text{(Eq. 4)}$$

where κ is the modulus of illumination reflected from the object. The pixel response P at this point is an integration of the reflected light and the effect of the intensification:

$$P = \int_0^{2\pi} R(t)M(t)dt = 2\mu_L\mu_M\pi + \kappa\pi\gamma\cos(\omega) \quad \text{(Eq. 5)}$$

In the range imaging system disclosed in the aforementioned '616 patent, a reference image is captured during which time the micro-channel plate 30 is not modulated, but rather kept at a mean response. In that case, equation (5) fundamentally is unchanged, though M(t) is now simply a constant $\mu_M$. The range is estimated for each pixel by recovering the phase term as a function of the value of the pixel in the reference image and the phase image. There are several reasons why this approach is not robust. Included in this is the fact that the analysis depends upon continuous values. The range estimation is based upon the portion of the phase image relative to the reference image. For digital systems the relative quantization of the phase image to the reference image decreases as the response of the reference image decreases. The system is also somewhat noise sensitive.

A robust approach which overcomes the limitations of the method proposed in the '616 patent is described in copending application Serial No. 09/342,370, entitled "method and Apparatus for Scannerless Range Image Capture Using Photographic Film" and filed in the names of Lawrence Allen Ray and Timothy P. Mathers, which is assigned to the assignee of this application and which is incorporated herein by reference. Instead of collecting a phase image and a reference image, the improved approach collects at least three phase images (referred to as an image bundle). In the previous approach, the micro-channel plate 30 and the laser illuminator 12 were phase locked. The improved approach shifts the phase of the micro-channel plate 30 relative to the phase of the illuminator 12, and each of the phase images has a distinct phase offset. For this purpose, the range processor 36 is suitably connected to control the phase offset of the modulator 16, as well as the average illumination level and such other capture functions as may be necessary. If the image intensifier 26 (or laser illuminator 14) is phase shifted by $\theta_i$, the pixel response from equation (5) becomes:

$$P_i = 2\mu_L\mu_M\pi + \kappa\pi\gamma \cos(\omega + \theta_i) \quad \text{(Eq. 6)}$$

It is desired to extract the phase term $\omega$ from the expression.

However, this term is not directly accessible from a single image. In equation (6) there are three unknown values: the mean term $\mu_L\mu_M$, the moduli term $\kappa\gamma$ and the phase term $\omega$. As a result, mathematically only three samples (from three images) are required to retrieve an estimate of the phase term caused by the distance to an object in the scene. Therefore, a set of three images captured with unique phase shifts is sufficient to determine $\omega$. For simplicity, the phase shifts are given by $\theta_i = 2\pi i/3$; i=0,1,2. In the following description, an image bundle shall be understood to constitute a collection of images which are of the same scene, but with each image having a distinct phase offset obtained from the modulation applied to the micro-channel plate. It should also be understood that an analogous analysis may be performed by phase shifting the illuminator 14 instead of the micro-channel plate 30.

Figure 2:
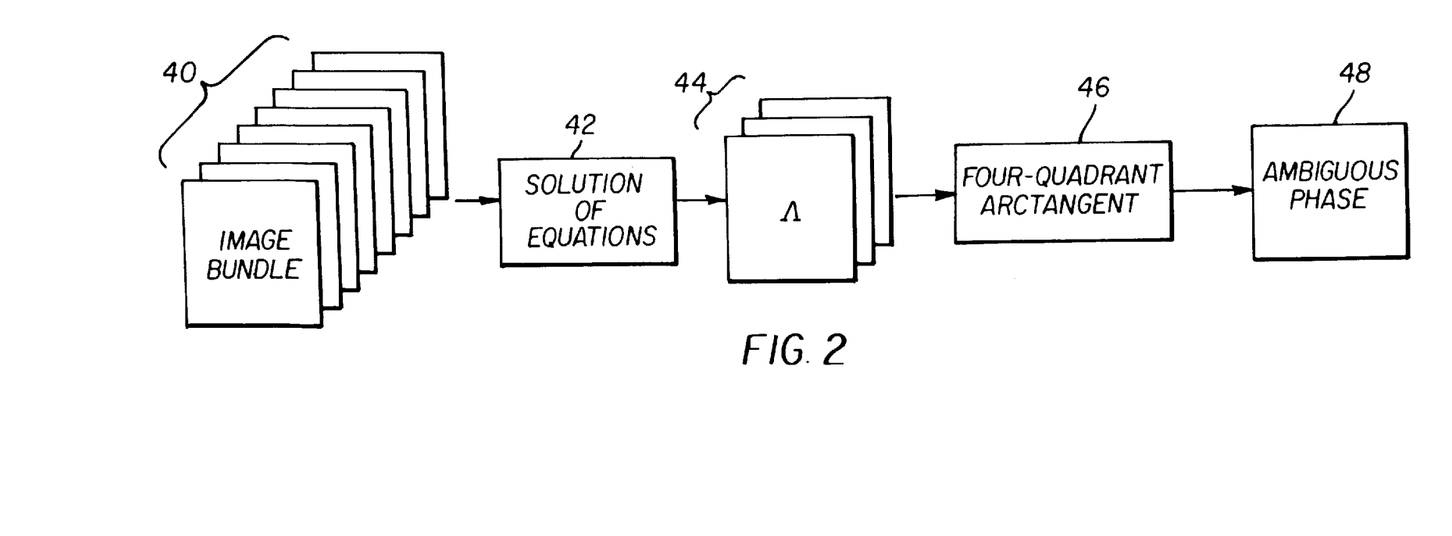
FIG. 2 is a diagram of a method of computing an ambiguous range image from an image bundle captured by the range imaging system shown in FIG. 1.

FIG. 2 shows stages in the computation of an ambiguous phase image from the image bundle. If images are captured with n≧3 distinct phase offsets of the intensifier (or laser or a combination of both) these images form an image bundle 40. Applying Equation (6) to each image in the image bundle and expanding the cosine term (i.e., $P_i=2\mu_L\mu_M\pi+\kappa\pi\gamma(\cos(\omega)\cos(\theta_i)-\sin(\omega)\sin(\theta_i))$) results in the following system of linear equations in n unknowns at each point:

$$\begin{pmatrix} P_1 \\ P_2 \\ \vdots \\ P_n \end{pmatrix} = \begin{pmatrix} 1 & \cos\theta_1 & -\sin\theta_1 \\ 1 & \cos\theta_2 & -\sin\theta_2 \\ \vdots & \vdots & \vdots \\ 1 & \cos\theta_n & -\sin\theta_n \end{pmatrix} \begin{pmatrix} \Lambda_1 \\ \Lambda_2 \\ \Lambda_3 \end{pmatrix} \quad \text{(Eq. 7)}$$

where $\Lambda_1=2\mu_L\mu_M\pi$, $\Lambda_2=\kappa\pi\gamma \cos \omega$, and $\Lambda_3=\kappa\pi\gamma \sin \omega$. If only three images are used, this linear system of equations is well-determined and its solution lends itself to a wide variety of numerical algorithms. In order to minimize rounding errors, the algorithm used is the LU decomposition with pivoting (which is described in Golub and Van Loan, *Matrix Computations*, Johns Hopkins University Press, 3rd ed., 1996). Many other methods of solution exist; e.g. decomposition-substitution methods, computing an inverse directly, Cramer's rule, etc.; however, all of these methods perform an equivalent task. If more than three images are used, the linear system is over-determined and its solution lends itself to a wide variety of least squares techniques. For example, if an image bundle comprising more than three images is captured, then the estimates of range can be enhanced by a least squares analysis using a singular value decomposition (see, e.g., W. H. Press, B. P. Flannery, S. A. Teukolsky and W. T. Vetterling, *Numerical Recipes* (*the Art of Scientific Computing*), Cambridge University Press, Cambridge, 1986). In particular, a singular value decomposition is chosen (see Golub and Van Loan) because of its robustness against rounding errors. Many other methods of solution exist; e.g. QR decomposition, Givens transformation, Lanczos transformation, modified Gram-Schmidt, transformation to a quadratic programming problem, etc.; however, all of these methods perform an equivalent task.

This system of equations is solved by one of the aforementioned methods of solution 42 to yield the vector $\Lambda=[\Lambda_1, \Lambda_2, \Lambda_3]^T$. Since this calculation is carried out at every (x,y) location in the image bundle, $\Lambda$ is really a vector image 44 containing a three element vector at every point. The phase term $\omega$ is computed in block 46 at each point using the four-quadrant aretangent calculation:

$$\omega=\tan^{-1}(\Lambda_3, \Lambda_2) \quad \text{(Eq. 8)}$$

The resulting collection of phase values at each point forms the ambiguous phase image 48.

Once phase has been determined, range r can be calculated by:

$$r = \omega \frac{c}{4\pi\lambda} \quad \text{(Eq. 9)}$$

Equations (1)–(9) describe the method of estimating range using an image bundle with at least three images (i.e., n=3) corresponding to distinct phase offsets of the intensifier and/or laser. However, since $\omega$ is wrapped into a principal phase interval $(-\pi,\pi]$, the estimated range is ambiguous to within one wavelength.

Figure 3:
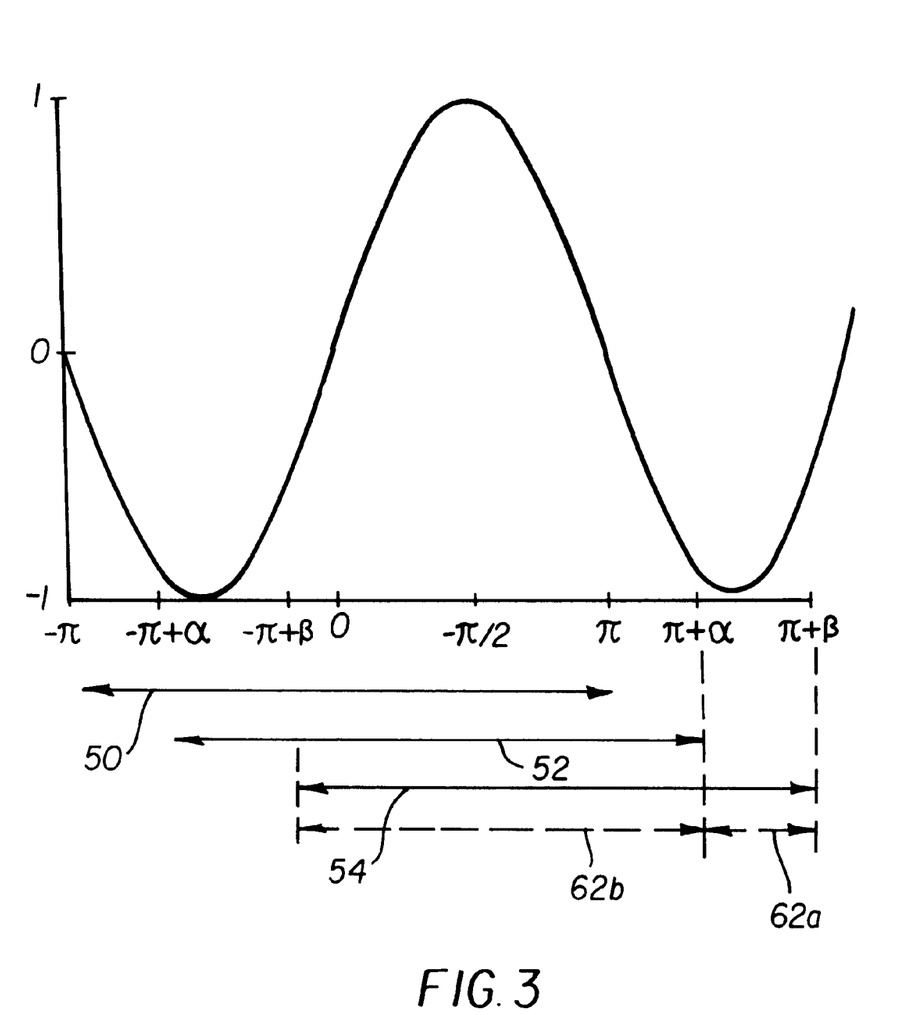
FIG. 3 is an illustration a shift in a region of ambiguity.

The principal object of the invention is to resolve phase ambiguities; i.e., to determine what integral multiples of $2\pi$ should be added to $\omega$ at each pixel location to yield an unwrapped phase image. The phase unwrapping method described in this invention spatially moves regions of ambiguity in the phase image by changing the principal phase interval from $(-\pi, \pi]$ to $(-\pi+\alpha, \pi+\alpha]$ where $|\alpha|<\pi/2$. FIG. 3 shows the shift in the principal phase interval. The original phase interval, $(-\pi, \pi]$, is shown by an interval indicator 50, and the shifted interval $(-\pi+\alpha, \pi+\alpha]$ is shown by an interval indicator 52. This shifting can be accomplished by letting the phase $\omega_\alpha \hat\omega=\alpha$ and modifying the value of $\Lambda_2$ and $\Lambda_3$ in Equation (7) to become $\Lambda_2=\kappa\pi\lambda \cos(\hat\omega+\alpha)$ and $\Lambda_3=\kappa\pi\gamma \sin(\hat\omega+\alpha)$. Expanding the sine and cosine terms and manipulating algebraically yields:

$$\Lambda_3-\Lambda_2 \tan \alpha=\sin \hat\omega(\cos \alpha+\sin \alpha \tan \alpha) \quad \text{(Eq. 10)}$$

$$\Lambda_2+\Lambda_2 \tan \alpha=\cos \hat\omega(\cos \alpha+\sin \alpha \tan \alpha) \quad \text{(Eq. 11)}$$

Solving the equations in (10) and (11) for $\hat\omega$ yields:

$$\hat\omega=\tan^{-1}(\Lambda_3-\Lambda_2 \tan \alpha, \Lambda_2+\Lambda_3 \tan \alpha) \quad \text{(Eq. 12)}$$

Since $\hat\omega\in(-\pi,\pi]$, the phase shift $\omega_\alpha=\hat\omega+\alpha\in(-\pi+\alpha,\pi+\alpha]$. The ambiguity regions in the image of phase shifts (o. (which will be denoted $\Omega_\alpha$, for the remainder of this disclosure) have been moved spatially from those in the image of phase shifts $\omega$.

The phase unwrapping method described to this point will be seen to operate upon two perturbed phase images, the aforementioned first phase image $\Omega_\alpha$ perturbed by the phase shift a and a second phase image $\Omega_\beta$ perturbed by a phase shift β. The second phase image $\Omega_\beta$ has regions of ambiguity that are spatially moved by changing the principal phase interval from $(-\pi, \pi]$ to $(-\pi+\beta, \pi+\beta]$, where α<β. FIG. 3 also shows this shift in the principal phase interval; the shifted interval $(-\pi+\beta, \pi+\beta]$ is shown by an interval indicator 54. However, in its most general sense, the phase unwrapping method described in this invention can be understood to operate upon two phase images, one phase image with unperturbed ambiguous phase, i.e, the aforementioned first phase image $\Omega_\alpha$ or second phase image $\Omega_\beta$ with either α=0 or β=0. In both the general case with one perturbed phase image and the specific case with two (or more) perturbed phase images, the invention is practiced similarly, that is, by finding (as will be explained) regions of intersection between the two phase images. (Also note that when α=0, then $\omega_\alpha=\omega$ for the "first" phase image, which accordingly is the "original" phase image derived from Equation (8).)

Figure 4A:
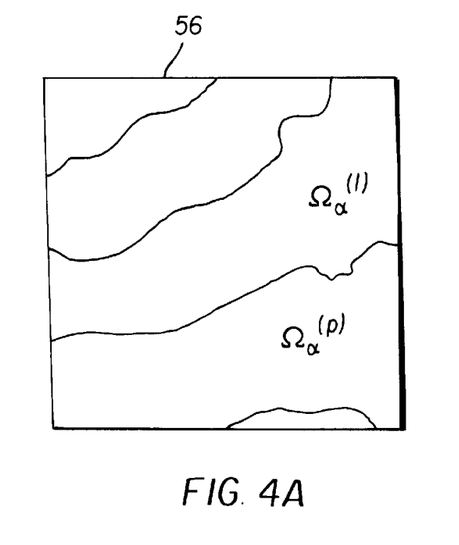
FIGS. 4A and 4B are illustrations of the effect of using a region-moving algorithm to determine appropriate phase offsets to remove ambiguities in the ambiguous range images captured in FIG. 2.
Figure 4B:
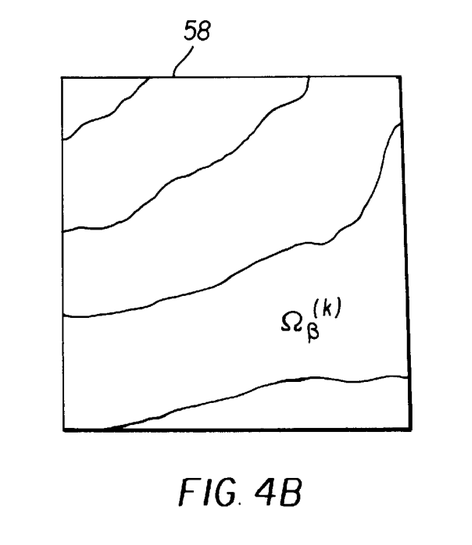
Figure 6:
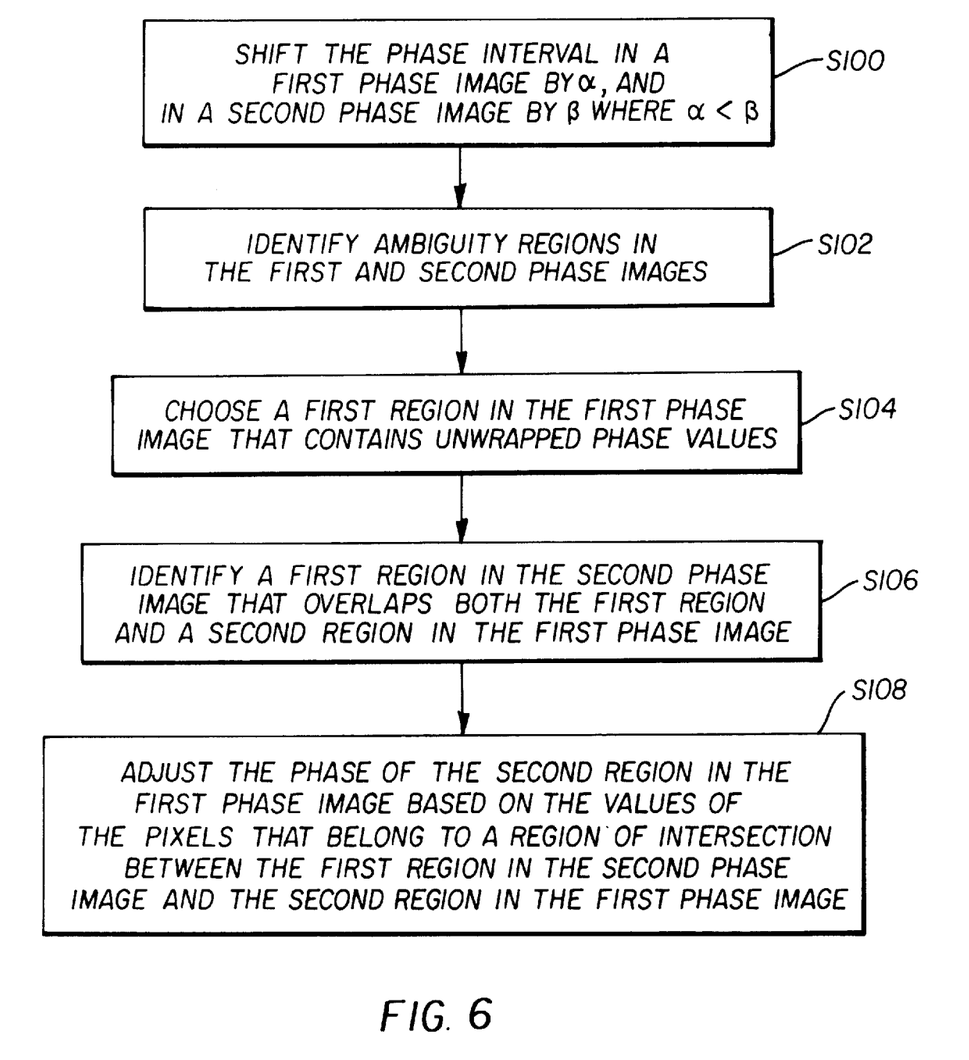
FIG. 6 is an illustration of the steps involved in unwrapping an ambiguous range image in accordance with the invention.

FIG. 4A shows the boundaries between regions in the first phase image $\Omega_\alpha$ (56) whose principal phase interval is $(-\pi+\alpha, \pi+\alpha]$, and FIG. 4B shows the boundaries between regions in the second phase image $\Omega_\beta$ (58), whose principal phase interval is $(-\pi+\beta, \pi+\beta]$. Tracking the movement of the ambiguity regions from image $\Omega_\alpha$ to image $\Omega_\beta$, where α<β without loss of generality, yields the appropriate offsets to unwrap the phase image. The first step S100 in this process, as shown in FIG. 6, is therefore one of generating first and second phase images $\Omega_\alpha$, $\Omega_\beta$ from an ambiguous original phase image by respectively shifting the ambiguous phase intervals by first and second phase shifts α, β, wherein the two phase shifts are bounded by $-\pi/2<\alpha<\beta<\pi/2$. The next step S102 is to identify the ambiguity regions in image $\Omega_\alpha$ and $\Omega_\beta$. Region boundaries exist where the phase shifts wrap; therefore any of a variety of edge-detection techniques can be used to find where the differences in phase approach 2π. It may also be necessary to employ a morphological technique to bridge boundary pixels together. Once all regions have been identified, each image can be represented as the union of mutually exclusive regions:

$$\Omega_\alpha = \bigcup_{i=1}^{m} \Omega_\alpha^{(i)} \quad \text{(Eq. 13)}$$

$$\Omega_\beta = \bigcup_{i=1}^{n} \Omega_\beta^{(i)} \quad \text{(Eq. 14)}$$

where $\Omega_\kappa^{(i)}$ is the $i^{th}$ region of $\Omega_\kappa$ (any ordering), and m and n are the number of regions in $\Omega_\alpha$ and $\Omega_\beta$, respectively.

Figure 5:
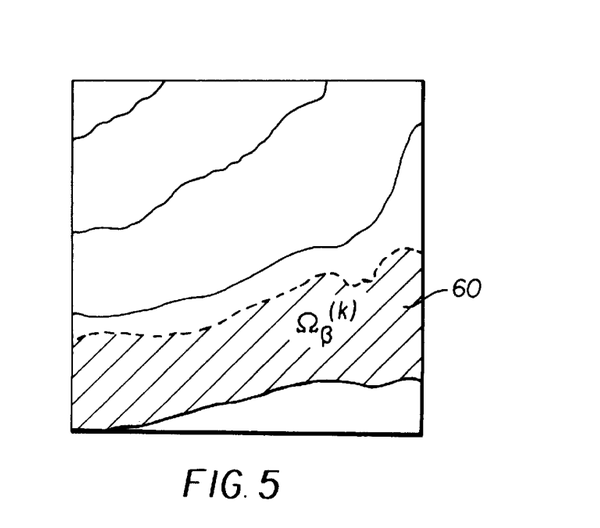
FIG. 5 is an illustration of a region of intersection between the two phase images shown in FIGS. 4A and 4B.

If α and β differ significantly, then for every i=1,2, . . . m, $\Omega_\alpha^{(i)}$ will overlap at least one region of $\Omega_\beta$ which overlaps at least two regions of $\Omega\alpha$. Likewise, for every j=1,2, . . . n, $\Omega_\beta^{(j)}$ will overlap at least one region of $\Omega_\alpha$ which overlaps at least two regions of $\Omega_\beta$. Referring again to FIG. 6, and without loss of generality, a first region $\Omega_{\alpha(l)}$ is chosen in step S104 to contain unwrapped phase values. Other regions of $\Omega_\alpha$ can be unwrapped by the following process. First, in step S106 a first region $\Omega_\beta^{(k)}$ of the second phase image $\Omega_\beta$ that overlaps both the first region $\Omega_\alpha^{(l)}$ and another second region in $\Omega_\alpha$, say $\Omega_\alpha^{(p)}$ of the first phase image is identified. (FIG. 4 illustrates the regions $\Omega_\alpha^{(l)}$, $\Omega_\beta^{(k)}$, and $\Omega_\alpha^{(p)}$; FIG. 5 shows the region $\Omega_\beta$ with a region of intersection between $\Omega_\beta^{(k)}$ and $\Omega_\alpha^{(p)}$). If the pixels in $\Omega_\beta$ belonging to a region of intersection 60 (see FIG. 5) between $\Omega_\beta^{(k)}$ and $\Omega_\alpha^{(p)}$ take on values in $(\pi+\alpha, \pi+\beta]$, which values are within an interval 62a of the plot in FIG. 3, then in step S108 the pixels in $\Omega_\alpha$ belonging to $\Omega_\alpha(p)$ should be offset by 2π. If the pixels in Op belonging to the region of intersection 60 between $\Omega_\beta^{(k)}$ and $\Omega_\alpha^{(p)}$ take on values in $(-\pi+\beta, \pi+\alpha]$, which values are within an interval 62b of the plot in FIG. 3, then (also in step S108) the pixels in $\Omega_\alpha$ belonging to $\Omega_\alpha^{(p)}$ should be offset by −2π. If any other regions of $\Omega_\beta$ overlap both $\Omega_\alpha^{(l)}$ and another region in $\Omega^\alpha$, say $\Omega_\alpha^{(q)}$, then an offset for $\Omega_\alpha^{(l)}$ is determined in the same way.

Once the process has been completed for $\Omega_\alpha^{(l)}$, $\Omega_\alpha^{(l)}$ is excluded from the set of regions making up $\Omega_\alpha$, and the entire process is repeated for the other regions of $\Omega_\alpha$, starting with the bordering regions of $\Omega_\alpha^{(l)}$. However, new offsets that are determined must be added to the offsets of the current iteration's starting region of $\Omega^\alpha$. Once all regions of $\Omega^\alpha$ have been examined in turn, the offsets accumulated for each region are added to the phase shift values of $\Omega_\alpha$, producing an unambiguous (unwrapped) phase image.

In summary, a technique of estimating unambiguous phase shifts using a laser radar range imaging system has been developed. After capturing at least three images corresponding to phase offsets of the modulated laser source or receiver, the phase shift of the intensity modulation reflected from an object can be calculated. This phase shift can be used to calculate range to the object; however, phase shifts are ambiguous (they can only be determined modulo 2π). An additional parameter is introduced into the phase calculation step. The perturbation of this parameter combined with a morphological image processing technique identifies regions where an additive offset should be applied in order to remove phase ambiguities.

The invention has been described with reference to a preferred embodiment. However, it will be appreciated that variations and modifications can be effected by a person of ordinary skill in the art without departing from the scope of the invention.

Parts List

10 range imaging system
12 scene
14 illuminator
16 modulator
18 output beam
20 reflected beam
22 receiving section
24 photocathode
26 image intensifier
28 conductive sheet
30 microchannel plate
32 phosphor screen
34 capture mechanism
36 range processor
40 image bundle
42 method of solution
44 vector image
46 four-quadrant arctangent
48 ambiguous phase image
50 original phase interval
52 first shifted phase interval
54 second shifted phase interval
56 first phase image
58 second phase image
60 region of intersection
62a interval indicator
62b interval indicator
S100–S108 steps

What is claimed is:
1. A method of unambiguous range estimation for use with a range imaging system that generates phase images corresponding to range information derived from image pixels of a digital image, said method comprising the steps of:

(a) generating a first phase image having one or more ambiguous phase intervals;

(b) generating at least one additional phase image by shifting the phase intervals of the first phase image;

(c) identifying at least one region of intersection between phase intervals in the two phase images; and (d) adjusting the phase of at least one of the ambiguous phase intervals in the first phase image based on values of the phase of the image pixels that belong to the region of intersection, whereby the phase adjustment unwraps the phase ambiguity in one or more of the ambiguous phase intervals of the first phase image.

2. The method as claimed in claim 1 wherein the range imaging system generates an ambiguous original phase image corresponding to the range information and the first phase image is generated from the ambiguous original phase image by shifting the phase intervals in the ambiguous phase image by a phase amount $\alpha$, and said at least one additional phase image is generated by shifting the phase intervals of the first phase image by a phase amount $\beta$, where $\alpha<\beta$.

3. The method as claimed in claim 1 wherein the step (d) of adjusting the phase comprises offsetting the phase by $\pm 2\pi$.

4. A method of unambiguous range estimation for use with a range imaging system that generates phase images corresponding to range information derived from image pixels of a digital image, said method comprising the steps of:

(a) generating a first phase image having one or more ambiguous phase intervals, wherein image pixels of the first phase image include a phase term that is derived from an algorithm operating on one or more images captured by the range imaging system;

(b) generating at least one additional phase image by including a phase shift in the algorithm that perturbs the phase intervals of the first phase image;

(c) identifying at least one region of intersection between at least one phase interval in the first phase image and at least one perturbed phase interval in the additional phase image; and (d) adjusting the phase of at least one of the ambiguous phase intervals in the first phase image based on values of the phase of the image pixels that belong to the region of intersection, whereby the phase adjustment unwraps the phase ambiguity in one or more of the ambiguous phase intervals of the first phase image.

5. The method as claimed in claim 4 wherein the phase term in step (a) that is derived from an algorithm operating on one or more images captured by the range imaging system is derived from a solution to a system of equations corresponding to a bundle of three or more images captured by the range imaging system, and the step (b) of generating at least one additional phase image includes a phase shift in the solution to the system of equations that perturbs the phase intervals of the first phase image.

6. The method as claimed in claim 4 wherein the range imaging system generates an ambiguous original phase image corresponding to the range information and the first phase image is generated from the ambiguous original phase image by shifting the phase intervals in the ambiguous phase image by a phase amount $\alpha$, and said at least one additional phase image is generated by shifting the phase intervals of the first phase image by a phase amount $\beta$, where $\alpha<\beta$.

7. The method as claimed in claim 4 wherein the step (d) of adjusting the phase comprises offsetting the phase by $\pm 2\pi$.

8. A method for unambiguous range estimation for use with a range imaging system that generates an original ambiguous phase image having ambiguous phase intervals corresponding to range information derived from image pixels of a digital image, said method comprising the steps of:

(a) generating first and second phase images from the original ambiguous phase image by respectively shifting the ambiguous phase intervals by first and a second phase shifts, wherein the first phase shift in the first phase image is less than the second phase shift in the second phase image;

(b) identifying ambiguity regions in the first and second phase images, wherein each phase image is represented as a union of mutually exclusive ambiguity regions;

(c) selecting a first ambiguity region in the first image that contains unwrapped phase values;

(d) selecting an ambiguity region in the second phase image that overlaps both the first and a second ambiguity region in the first phase image; and (e) adjusting the phase of the second ambiguity region in the first phase image based on the values of the pixels that belong to a region of intersection between the ambiguity region in the second phase image and the second ambiguity region in the first phase image, whereby the phase values are unwrapped in the second ambiguity region in the first phase image.

9. A method as claimed in claim 8 wherein step (e) comprises the step of offsetting the phase of the pixels in the second ambiguity region of the first phase image by $\pm 2\pi$.

10. A method as claimed in claim 9 wherein the first and second phase shifts are denoted $\alpha$ and $\beta$, respectively, and $\alpha<\beta$, and wherein the step (e) comprises offsetting the phase of the pixels in the second ambiguity region of the first phase image by $2\pi$ if the pixels in the intersecting region take on values in a phase interval $(\pi+\alpha,\pi+\beta]$, and by $-2\pi$ if the pixels in the intersecting region take on values in a phase interval $(-\pi+\beta, \pi+\alpha]$.

11. A method as claimed in claim 8 wherein step (b) comprises the step of identifying the boundaries of ambiguity regions with an edge-detection technique.

12. A method as claimed in claim 8 wherein steps (c) through (e) are repeated for each of the other ambiguity regions of the first phase image in order to unwrap the phase values in these regions.

13. A computer program product for unambiguous range estimation in a range imaging system that generates phase images corresponding to range information derived from image pixels of a digital image, said computer program product comprising a computer readable storage medium having a computer program stored thereon for performing the steps of:

(a) generating a first phase image having one or more ambiguous phase intervals;

(b) generating at least one additional phase image by shifting the phase intervals of the first phase image;

(c) identifying at least one region of intersection between phase intervals in the two phase images; and (d) adjusting the phase of at least one of the ambiguous phase intervals in the first phase image based on values of the phase of the image pixels that belong to the region of intersection, whereby the phase adjustment unwraps the phase ambiguity in one or more of the ambiguous phase intervals of the first phase image.

14. The computer program product as claimed in claim 13 wherein the range imaging system generates an ambiguous original phase image corresponding to the range information and the first phase image is generated from the ambiguous original phase image by shifting the phase intervals in the ambiguous phase image by a phase amount $\alpha$, and said at least one additional phase image is generated by shifting the phase intervals of the first phase image by a phase amount $\beta$, where $\alpha<\beta$.

15. The computer program product as claimed in claim 14 wherein the step (d) of adjusting the phase comprises offsetting the phase by $\pm 2\pi$.

16. A range imaging system capable of unambiguous range estimation, said system comprising:
   (a) a range imaging apparatus that generates phase images corresponding to range information derived from image pixels of a digital image;
   (b) means for generating a first phase image having one or more ambiguous phase intervals;
   (c) means for generating at least one additional phase image by shifting the phase intervals of the first phase image;
   (d) means for identifying at least one region of intersection between phase intervals in the two phase images; and
   (e) means for adjusting the phase of at least one of the ambiguous phase intervals in the first phase image based on values of the phase of the image pixels that belong to the region of intersection, whereby the phase adjustment unwraps the phase ambiguity in one or more of the ambiguous phase intervals of the first phase image.

17. The system as claimed in claim 16 wherein the range imaging apparatus generates an ambiguous original phase image corresponding to the range information and the first phase image is generated from the ambiguous original phase image by shifting the phase intervals in the ambiguous phase image by a phase amount $\alpha$, and said at least one additional phase image is generated by shifting the phase intervals of the first phase image by a phase amount $\beta$, where $\alpha<\beta$.

18. The system as claimed in claim 16 wherein the means for adjusting the phase comprises means for offsetting the phase by $\pm 2\pi$.

19. The system as claimed in claim 16 wherein the range imaging apparatus comprises a scannerless laser radar range imaging system.

* * * * *